June 13, 1967 D. P. LOWER 3,325,175
SHAFT SEAL WITH MULTIPLE LIPS
Filed Feb. 5, 1965 2 Sheets-Sheet 1

INVENTOR.
DONALD P. LOWER
BY M. A. Hobbs
ATTORNEY

United States Patent Office 3,325,175
Patented June 13, 1967

3,325,175
SHAFT SEAL WITH MULTIPLE LIPS
Donald P. Lower, Mishawaka, Ind., assignor to Dodge Manufacturing Corporation, Mishawaka, Ind., a corporation of Indiana
Filed Feb. 5, 1965, Ser. No. 430,551
4 Claims. (Cl. 277—171)

The present invention relates to seals, and more particularly to a sealing means for use primarily to seal a shaft on either side of a lubricating chamber of a bearing.

The various types of seals which have been used in the past for sealing bearing lubricating chambers around rotating shafts have had a number of inherent defects or disadvantages which have resulted in leakage of the lubricant from the chamber and permitted foreign material to enter the bearing housing. These difficulties are particularly pronounced in self-aligning bearings wherein the seal must be capable of adapting to slight misalignment of the shaft and bearing if an effective seal around the shaft is to be maintained. The labyrinth seals which have been used in self-aligning bearings will perform satisfactorily under certain conditions when greases are used as the lubricating material, but when oil or other liquid lubricants are used, they fail to prevent leakage and, with either the grease or oil, the foreign material will inherently find its way past the seal into the working parts of the bearing. Efforts have been made in the past to use flexible seals of rubber, neoprene or other elastomeric materials, but these flexible seals have likewise had certain inherent defects, including excessive wear and frequent premature failure and failure to adapt themselves to excessive shaft misalignment without leakage of lubricant. Further, in order to overcome the foregoing difficulties with the seals of elastomeric material, seals have been designed having multiple annular grooves and lips, but these generally have been too intricate to be practical, or have not been adaptable to shaft misalignment within the normal permissible limits. It is therefore one of the principal objects of the present invention to provide a shaft and bearing seal of the elastomeric type and of the multiple groove and lip construction, which will readily and effectively adapt itself to substantial shaft and bearing misalignment while still maintaining an effective lubricant seal and preventing ingress of dirt and other foreign materials, and which can be easily installed in the bearing housing and on the shaft.

Another object of the invention is to provide a shaft seal of the elastomeric type which is relatively simple in construction and which will give long, trouble-free service regardless of whether the lubricant used in the bearing is grease or oil, and in spite of adverse operating conditions in which it is subjected to dirt, grit and other similar foreign materials.

Still another object of the invention is to provide a shaft seal of the foregoing type which can be used interchangeably with the aforementioned labyrinth seals and as replacements therefor, and which can be used effectively in various types of shaft bearing installations requiring an effective lubricant seal.

A further object is to provide a shaft and bearing seal of rubber or rubber-like material which can easily be fabricated using standard production equipment, and which can be constructed of various compositions most suited to withstanding corrosive and abrasive operating conditions and withstanding prolonged operation at elevated or subnormal temperatures without adversely affecting its ability to maintain an effective seal and to exclude foreign materials.

Additional objects and advantages of the invention will become apparent from the following description and accompanying drawings, wherein.

Figure 1:
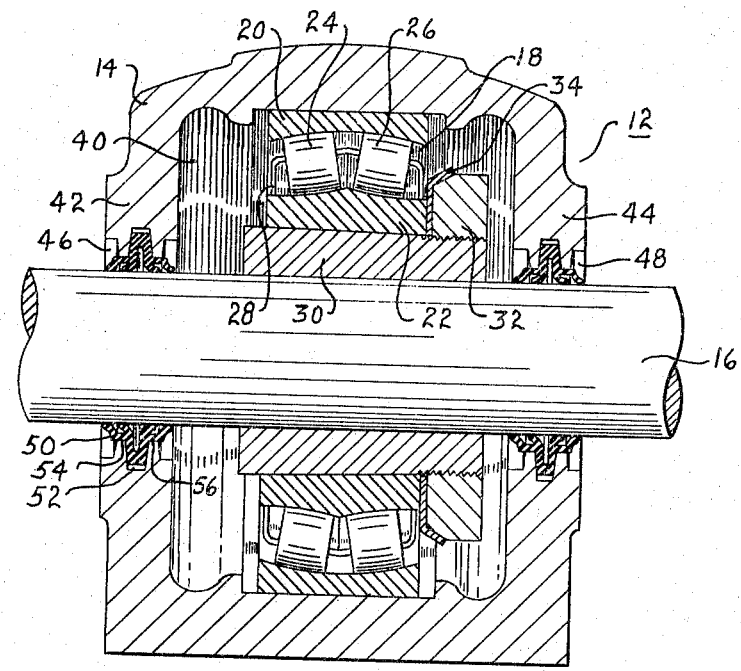
FIGURE 1 is a vertical cross sectional view through a pillow-block of the spherical roller bearing type with the present seal incorporated therein on either side of the housing.
Figure 2:
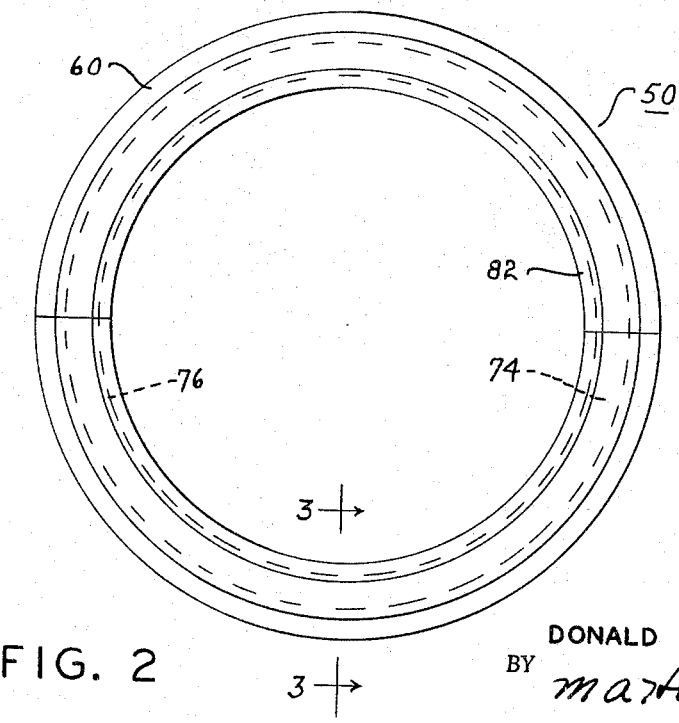
FIGURE 2 is a side elevational view of the present seal removed from the pillow-block shown in FIGURE 1.

Referring more specifically to the drawings and to FIGURE 1 in particular, numeral 12 designates generally the pillow-block in which the present seal is mounted, 14 the housing for the pillow-block, and 16 a shaft journaled in the bearing of the pillow-block 12. The pillow-block illustrated in the drawings may be considered conventional for the purposes of the present invention, and contains a spherical roller bearing 18 having an outer race 20, an inner race 22 and two sets of roller bearings 24 and 26, disposed between the two races and held in place by spacer member 28. The foregoing assembly, including the inner and outer races, is held rigidly on shaft 16 by an adapter 30 which snugly grips the external surface of the shaft and the internal surface of race 22, the adapter having a tapered external surface for engaging the tapered internal surface of the race. The bushing is split throughout its length and is provided with a nut 32 which urges the tapered surfaces of the adapter and inner race together, thereby firmly seating the two and causing the adapter to contract and firmly grip the surface of the shaft. The adjustment of nut 32 is maintained by lock washer 34 disposed between the nut and the adjacent surface of inner race 22. The type of bearing used in the housing, which may be considered conventional for the purpose of the present invention, permits misalignment between shaft 16 and the pillow-block by permitting the inner and outer races and roller bearings to shift laterally in adjusting to the misalignment.

The housing of the pillow-block contains a chamber 40 for a suitable lubricant, such as grease or oil, for constantly bathing the roller bearings in the lubricant. The chamber completely surrounds the bearing on opposite sides thereof, with the right and left portions of the chamber communicating freely with one another through the space between the inner and outer races of the bearing. In the past, no serious difficulty was encountered in the use of conventional labyrinth or elastomeric seals when greases were used in chamber 40; however, when liquid lubricants, such as oil were used, there was a tendency for the seals to develop seepage or other leakage which was materially increased with an increase in misalignment between the shaft and the pillow-block. In both the conventional labyrinth and elastomeric seals, regardless of whether grease or oils were used as the lubricant, foreign matter would inevitably find its way past the seal into the lubricating chamber.

The sides 42 and 44 of housing 14 contain openings 46 and 48, respectively, for receiving shaft 16, the two openings being somewhat larger than the shaft in order to receive the present seal 50. The portion of the housing side walls defining openings 46 and 48 contains an annular groove 52 having a slight frusto-conical shape for receiving the external portion of seal 50, and contains two lands 54 and 56 on opposite sides of the annular groove, the two lands having a substantially flat surface parallel with the surface of shaft 16 and spaced radially outwardly therefrom.

Figure 3:
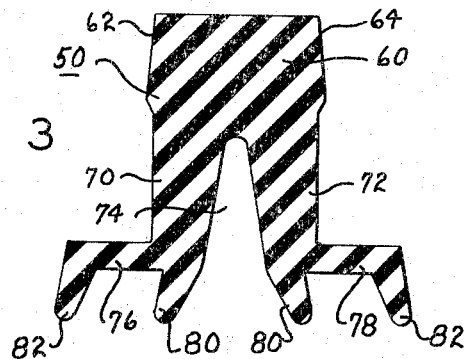
FIGURE 3 is an enlarged radial cross sectional view of the present shaft seal, the section being taken on line 3—3 of FIGURE 2.

The present seal 50 is preferably constructed of neoprene, rubber or other suitable elastomeric material of a composition resistant to the lubricating material and to normal abrasion occurring between the seal and the shaft. In the embodiment of the invention illustrated in the drawings, the seal is provided with an annular body 60 having tapered side walls 62 and 64 for engaging the tapered side walls of annular groove 52 and for seating on said tapered surfaces in a fluid-tight relationship. The body portion will readily seat in annular groove 52 and the two tapered sides thereof will automatically seat on the sides of the annular groove and will remain in the fluid-tight relationship throughout the normal operation of the pillow-block. Extending inwardly from body 60 are two annular portions 70 and 72, separated from one another by an internal groove 74 which renders the two annular portions readily flexible relative to one another. The inner edges of portions 70 and 72 are provided with flanges 76 and 78 which extend outwardly axially from the respective portions 70 and 72. The flanges and/or the respective annular portions contain inner and outer lips 80 and 82, respectively, the lips on each of the annular portions 70 and 72 extending outwardly and preferably provided with a curved inner surface, as illustrated in FIGURE 3, so that an effective seal can be obtained between those surfaces and the external surfaces of the shaft. The lips 80 and 82 each slope outwardly toward their respective external side in order to provide a more effective oil retaining and dirt excluding contact with the shaft.

Figure 4:
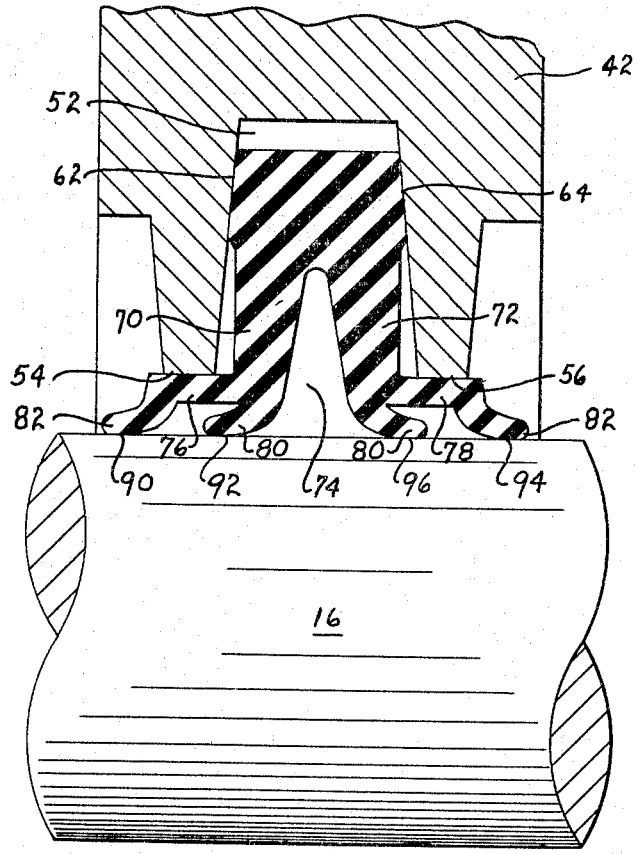
FIGURE 4 is an enlarged fragmentary cross sectional view showing the seal mounted in the pillow-block on the shaft as seen in FIGURE 1.

In the use of the present shaft seal, body 60 is seated in annular groove 52 with the sides 62 and 64 of the seal engaging the sloping sides of the annular groove in the manner illustrated in FIGURES 1 and 4, forming a fluid-tight contact between the housing and the seal. Further, the two flanges 76 and 78 seat firmly on lands 54 and 56 of the housing, forming two additional seals for retaining the lubricant in the housing and for excluding dirt, moisture and other foreign materials from the bearing. The spacing between the external surface of the shaft and the two lands is such that when the seal is installed in place in annular groove 52 and shaft 16 is placed in the bearing, the two lips 80 and 82 of annular portion 70 are depressed or distorted outwardly, thereby causing the lips to apply pressure on the shaft at points 90 and 92. In the event any dirt or other foreign material should pass lip 82, it can still be effectively prevented from further ingress by the firm contact of lip 80 at point 92. Likewise, the two lips 80 and 82 of annular portion 72 retain the oil in chamber 40 by the firm pressure of lip 82 at point 94 and the firm pressure of lip 80 at point 96.

It is thus seen that the seal has four effective sealing surfaces on both the external and internal sides thereof, the points on the external surface being located at the two lands 54 and 56 and on the two tapered sides of groove 52, and on the internal side by the lips at points 90, 92, 94 and 96. The present seal can be readily and effectively installed in the housing and will form a fluid-tight seal on both the internal and external portions or sides for long trouble-free service.

The labyrinth seals normally used have a loose or slip fit on the shaft to provide expansion of the shaft. This loose fit permits lubricant leakage and entry of foreign material and often frets and locks to the shaft causing metal to metal contact of the seal to the housing groove, creating heat in operation and resulting in damage to the housing and seals. The present seal permits movement of the shaft through the seal lips as the shaft both expands and contracts, avoiding the problems above described with the labyrinth seals.

To further form a more effective seal and provide lubrication of lip surfaces in contact with the shaft, a suitable semi-fluid lubricant (grease) is inserted into the spaces between the lips prior to assembly on the shaft.

While only one embodiment of the present invention has been described in detail herein, various changes and modifications may be made without departing from the scope of the invention.

I claim:

1. A seal for a shaft and bearing having a housing with spaced openings and a lubricant chamber therebetween and with an annular groove in the housing defining said openings and an annular flat land on each side of said openings, said groove having inwardly tapered side walls, said seal being of elastomeric material and comprising an annular body having tapered side walls engaging the tapered side walls of said groove, spaced inwardly extending annular portions joined integrally to said body and having a radial groove therebetween, a laterally outwardly extending annular flange joined integrally to the internal edge of each of said annular portions, each flange having a flat axially extending sealing surface engaging and seating on the respective land, an annular lip on the external edge of each of said flanges extending generally radially inwardly therefrom but sloping toward the adjacent outer side of the seal, and an annular lip on the inner end of each of said annular portions extending generally radially inwardly therefrom but sloping toward the adjacent outer side of the seal.

2. A seal for a shaft and bearing having a housing with spaced openings and a lubricant chamber therebetween and with an annular groove and two flat axially extending lands on either side of said groove in the housing defining said openings and with tapered side walls, said seal comprising an annular body having tapered side walls engaging the tapered side walls of said groove, spaced inwardly extending annular portions joined integrally to said body, a laterally outwardly extending annular flange joined integrally to the internal edge of each of said annular portions, each flange having a flat axially extending sealing surface engaging and seating on the respective land, an annular lip on the external edge of each of said flanges extending generally radially inwardly therefrom but sloping toward the adjacent outer side of the seal, and an annular lip on the inner end of each of said annular portions extending generally radially inwardly therefrom but sloping toward the adjacent outer side of the seal.

3. A seal for a shaft and bearing having a housing with spaced openings and a lubricant chamber therebetween and with an annular groove in the housing defining said openings and an annular flat land on each side of said openings, said groove having inwardly tapered side walls, said seal being of elastomeric material and comprising an annular body having tapered side walls engaging the tapered side walls of said groove, spaced inwardly extending annular portions joined integrally to said body and having a radial groove therebetween and a laterally outwardly extending annular flange joined integrally to the internal edge of each of said annual portions, each flange having a flat axially extending sealing surface engaging and seating on the respective land, and a plurality of inwardly extending lips on each of said annular portions extending inwardly therefrom, said lips being flexible and deflectable axially toward the adjacent outer side of the seal for forming a firm contact with the shaft.

4. A seal for a shaft and bearing having a housing with spaced openings and a lubricant chamber therebetween and with an annular groove and two flat axially extending lands on either side of said groove in the housing defining said openings, said seal comprising an annular body having tapered side walls engaging the tapered side walls of said groove, spaced inwardly extending annular portions joined integrally to said body and having a laterally outwardly extending annular flange joined integrally to the internal edge of each of said annular portions, each flange having a flat axially extending sealing surface engaging and seating on the respective land, a plurality of inwardly extending lips on each of said annular portions extending inwardly therefrom, said lips being flexible and deflectable axially toward the adjacent outer side of the seal for forming a firm contact with the shaft.

References Cited

UNITED STATES PATENTS

| | | | |
|---|---|---|---|
| 1,287,285 | 12/1918 | Gammeter | 277—208 X |
| 2,676,040 | 4/1954 | Dalton | 277—206 X |
| 2,983,529 | 5/1961 | Price | 277—178 X |
| 3,118,681 | 1/1964 | Fuehrer | 277—171 X |
| 3,123,367 | 3/1964 | Brummer et al. | 277—171 |

SAMUEL ROTHBERG, *Primary Examiner.*